Patented Nov. 22, 1938

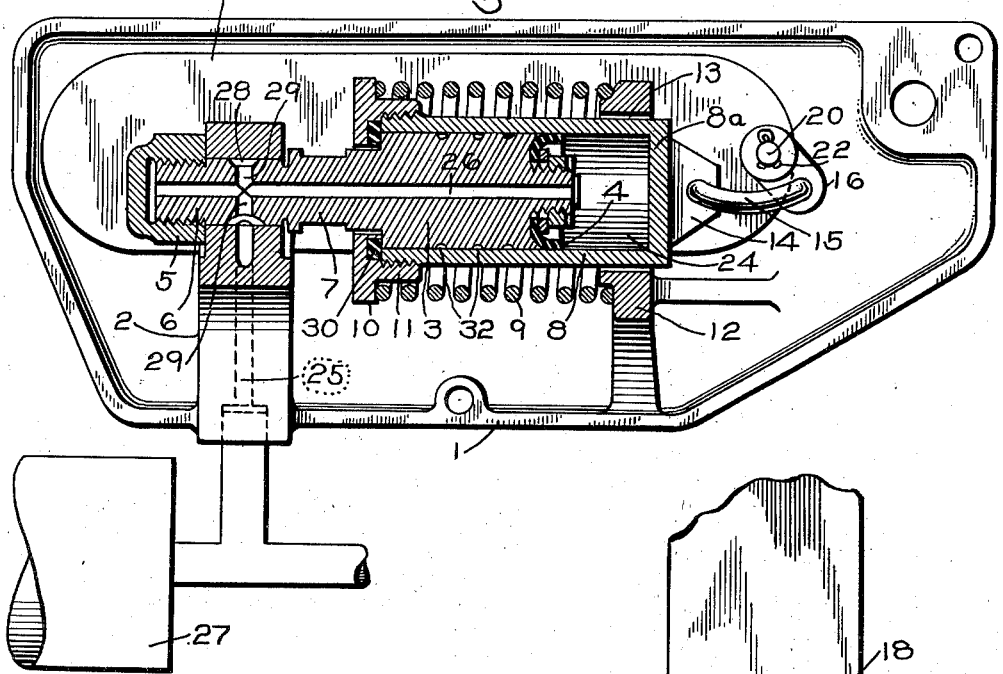
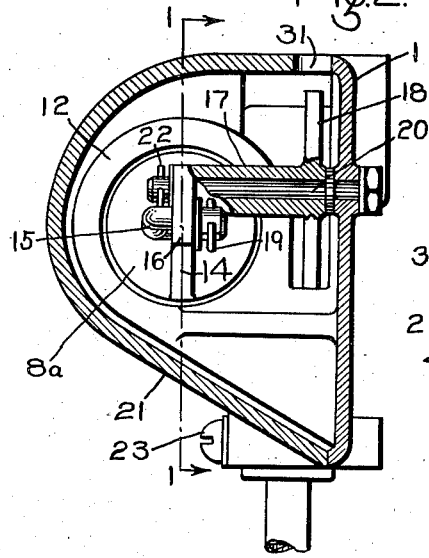
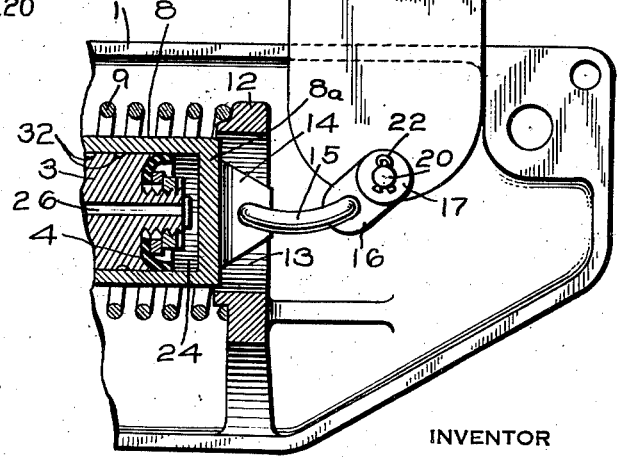

2,137,495

UNITED STATES PATENT OFFICE 2,137,495

FLUID PRESSURE INDICATING DEVICE

Arthur Greenwood Kershaw, King's Cross, London, England, assignor to The Westinghouse Air Brake Company, Wilmerding, Pa., a corporation of Pennsylvania Application March 13, 1937, Serial No. 130,751
In Great Britain March 23, 1936

3 Claims. (Cl. 116—65)

This invention relates to indicating devices and more particularly to devices for giving an indication or signal when the fluid pressure in a reservoir, cylinder or other portion of a fluid pressure braking system or the like falls below or exceeds a predetermined value, and the principal object of the invention is to provide a novel device of this type.

According to the invention the fluid pressure indicating device comprises an oscillatable signal arm which is arranged to be moved from one indicating position to another by means of a spring influenced movable abutment operatively connected to the signal arm and subject to the fluid pressure conditions to be indicated. The movable abutment may be constituted by a cylinder containing and slidably mounted on a fixed piston, and may be subject to the fluid pressure conditions to be indicated through a passage or passages leading through this piston to the interior of the cylinder, the spring referred to hereinbefore being preferably of helical form and surrounding the external cylindrical wall of the cylinder.

In the accompanying drawing, Fig. 1 is a partial sectional view of a signal or indicating device embodying the invention, the base plate of the device being shown in elevation and the cover removed; Fig. 2 is an end elevational view partly in section of the operating mechanism of the device with the base plate and cover shown in section; and Fig. 3 is a sectional view similar to a portion of Fig. 1 but showing certain parts in a different position.

As shown in the drawings, the indicating device comprises a base plate 1 having a lug or web 2 to which a piston body 3, provided with suitable packing 4, is rigidly secured by means of a nut 5 cooperating with the screw-threaded end 6 of the stem 7 of the piston body.

The piston body 3 is elongated and constitutes a guide for a movable cylinder 8 in which the piston body is located, a helical spring 9 being arranged so as to surround the external cylindrical wall of the cylinder 8, between the flange 10 of a flanged screw-threaded member 11 secured to the end of the cylinder from which the piston stem 7 projects, and a lug or web 12 of the base plate 1, this lug or web being apertured at 13 so as to permit the movement of the cylinder therethrough.

The cylinder head 8a at the other end of the cylinder 8 is provided with a lug 14 through an aperture in which one leg of a substantially U-shaped link 15 extends, the other leg of this link being arranged to extend through an aperture in a relatively short arm 16 of a sleevelike member 17 carrying a signal arm 18, the lug 14 and the relatively short arm 16 being in a substantially vertical plane containing the axis of the cylinder 8, while the legs of the link 15, which is held in position by means of split pins 19 extending through the legs at the ends thereof, are substantially horizontal. The sleeve 17 is rotatably mounted upon a stud bolt 20 extending substantially parallel to the legs of the link 15 and secured to the base plate 1, a split pin 22 extending through the inner end of the stud bolt 20 serving to hold the sleeve 17 in position. A cover 21 is secured to the base plate 1 by suitable screw-bolts such as 23, and is provided in one edge with a recess 31 through which the arm 18 is adapted to freely move.

The short arm 16 and the signal arm 18, are as shown in the drawing, preferably formed integrally with the sleeve 17.

The interior or chamber 24 of the movable cylinder 8 at the right hand side of the piston body 3 is adapted to be in permanent communication with any volume adapted to contain fluid pressure, such for instance as a main reservoir 27 of a braking system, through a passage 25 extending through the lug or web 2 of the base plate 1, an annular groove 28 in the circumferential surface of the piston stem 7, radial passages 29 in said stem, and thence through an axial passage 26 in the piston body itself.

In operation, so long as the fluid pressure obtaining in the main reservoir 27 and in the chamber 24 of the movable cylinder 8 exceeds a predetermined safe value, the movable cylinder is held against the action of the helical spring 9 in its right hand position relatively to the fixed piston 3, and the signal arm 18 is consequently held in a horizontal position within the casing (formed by the base plate 1 and cover 21) parallel to the axis of and alongside the cylinder 8, as shown in Fig. 1 of the drawing. Under these conditions a packing 30, provided in the flanged screw-threaded member 11, is urged against a shoulder of the piston body 3 and possible leakage of fluid from the chamber 24 of the cylinder 8 past the packed and elongated piston body, which is provided with grooves 32 to minimize leakage, is positively prevented.

In case the fluid pressure obtaining in the main reservoir 27 falls below the predetermined safe value, the cylinder 8 is moved towards the left hand relatively to piston 3 by the helical spring 9, until the flanged screw-threaded member 11 abuts against the lug 2 carrying the piston body 3, whilst the sleeve 17 is rotated through the intermediary of the link 15 in a clockwise direction, thus moving the signal arm 18 through the elongated aperture 31 between the base plate 1 and the cover 21 from its horizontal position within the casing to an upwardly extending, substantially vertical position outside the casing, as shown in Fig. 3 of the drawing.

In practice, the signal arm 18 may be arranged to assume its horizontal position whenever the pressure of fluid in main reservoir 27 has a value of for instance 55 pounds per square inch or more, and to assume its vertical position whenever the said pressure has a value of for instance 45 pounds per square inch or less.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A device for indicating the pressure condition of the fluid under pressure in a reservoir comprising a casing, a piston in said casing, a cylinder slidably mounted on said piston and forming therewith a chamber in constant communication with said reservoir whereby the pressure of fluid in said reservoir acts to urge said cylinder relative to said piston, a lug projecting from said casing and having an aperture through which said cylinder is adapted to operate, means on said cylinder forming a spring seat, a spring surrounding said cylinder and interposed between said lug and spring seat acting on said cylinder in opposition to the pressure of fluid in said chamber, said cylinder being movable relatively to said piston to one position when the pressure of fluid in said reservoir exceeds that of said spring and to another position when the pressure of said spring exceeds that of the fluid in said reservoir, and means operative by said cylinder in its different positions to indicate the pressure condition of the fluid in said reservoir.

2. A device for indicating the pressure condition of the fluid under pressure in a reservoir, comprising a casing having two spaced lugs, a piston carried by one of said lugs, the other lug having an aperture therein, a cylinder slidably mounted on said piston and extending through the aperture in the other lug and forming with said piston a chamber in constant communication with said reservoir whereby the pressure of fluid in said reservoir tends to move said cylinder on said piston, means at the non-pressure end of said cylinder forming a spring seat, a spring surrounding said cylinder and disposed between said spring seat and the apertured lug and acting on said cylinder in opposition to the pressure of fluid in said chamber, said cylinder being movable against said spring relative to said piston when the pressure of fluid in said reservoir exceeds that of said spring and being movable in the opposite direction by said spring when the pressure thereof exceeds that of the fluid in said reservoir, and means operative by said cylinder to indicate the pressure condition of the fluid under pressure in said reservoir.

3. A device for indicating the pressure condition of the fluid under pressure in a reservoir, comprising a casing having two spaced lugs, a piston carried by one of said lugs, the other lug having an aperture therein, a cylinder slidably mounted on said piston and extending through the aperture in the other lug and forming with said piston a chamber in constant communication with said reservoir whereby the pressure of fluid in said reservoir tends to move said cylinder on said piston, means at the non-pressure end of said cylinder forming a spring seat, a spring surrounding said cylinder and disposed between said spring seat and the apertured lug and acting on said cylinder in opposition to the pressure of fluid in said chamber, said cylinder being movable against said spring relative to said piston when the pressure of fluid in said reservoir exceeds that of said spring and being movable in the opposite direction by said spring when the pressure thereof exceeds that of the fluid in said reservoir, and means operative by said cylinder to indicate the pressure condition of the fluid under pressure in said reservoir, said piston and the lug carrying same having passageways forming the communication between said reservoir and chamber.

ARTHUR GREENWOOD KERSHAW.